US007631006B2

(12) United States Patent
Hagstrom et al.

(10) Patent No.: US 7,631,006 B2
(45) Date of Patent: Dec. 8, 2009

(54) MANAGING TEAM SOFTWARE PROJECTS USING VIRTUAL CONTAINERS

(75) Inventors: Amy Hagstrom, Duvall, WA (US); Bill Essary, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1020 days.

(21) Appl. No.: 11/090,735

(22) Filed: Mar. 25, 2005

(65) Prior Publication Data

US 2006/0218521 A1  Sep. 28, 2006

(51) Int. Cl.
*G06F 17/00* (2006.01)
*G06F 12/00* (2006.01)
*G06F 9/44* (2006.01)

(52) U.S. Cl. .................... 707/102; 707/203; 717/101
(58) Field of Classification Search .............. 707/1, 707/10, 100–102, 200; 717/101, 109, 113
See application file for complete search history.

(56) References Cited

U.S. PATENT DOCUMENTS

| | | | | |
|---|---|---|---|---|
| 5,950,000 A | * | 9/1999 | O'Leary et al. ............. | 717/105 |
| 6,851,107 B1 | * | 2/2005 | Coad et al. ................. | 717/108 |
| 6,922,827 B2 | * | 7/2005 | Vasilik et al. .............. | 717/140 |
| 6,961,873 B2 | * | 11/2005 | Dubovsky ................... | 714/38 |
| 6,968,538 B2 | * | 11/2005 | Rust et al. .................. | 717/108 |
| 6,993,759 B2 | * | 1/2006 | Aptus et al. ................ | 717/170 |
| 7,055,131 B2 | * | 5/2006 | Charisius et al. ........... | 717/109 |
| 2003/0188290 A1 | * | 10/2003 | Corral ........................ | 717/101 |

* cited by examiner

*Primary Examiner*—Miranda Le
(74) *Attorney, Agent, or Firm*—Wolf, Greenfield & Sacks, P.C.

(57) ABSTRACT

A virtual grouping of tools and artifacts is used during the development of a software application. A virtual container is created for each software project. Within the virtual container are a grouping of tools and artifacts unique to the respective software project. Each virtual container is created in a separate namespace. The tools and artifacts associated with a particular software project may not be accessible by any other project. A virtual container may contain a tool window to navigate a group of tools and artifacts unique to a software project. A virtual container may contain a cross-tool reporting tool to generate report data from the grouping of tools and artifacts unique to the software project.

11 Claims, 17 Drawing Sheets

MANAGING TEAM SOFTWARE PROJECTS USING VIRTUAL CONTAINERS

BACKGROUND OF INVENTION

The development of software applications and products often involves multiple stages (e.g., idea, design, implementation, testing and modeling) in its lifecycle. Each of the stages involved in the lifecycle of software development, has a specific tool set associated with it. These tools are typically shared among different software applications in development.

The development of software applications also often requires the coordinated efforts of many developers (e.g., software programmers). This development often involves the creation and modification of several artifacts, the collective body of which is often stored in a centralized, common repository shared by the developers.

There are several Integrated Development Environments (IDEs) available today to assist developers in collaboratively developing software and contain a portion of the necessary tools for software development, such as, for example, Microsoft® Visual Studio® available from Microsoft® Corporation.

SUMMARY OF INVENTION

In an embodiment of the invention, a system is provided for creating a virtual container for a software project. The system comprises a grouping of tools and artifacts unique to the software project within the virtual container.

In another embodiment of the invention, a method is provided for creating a virtual container for a software project. The method comprising of grouping tools and artifacts unique to the software project within the virtual container.

In yet another embodiment of the invention, a computer program product is described. The computer program product comprising a computer-readable medium. Computer-readable signals, stored on the computer-readable medium, define instructions that as a result of being executed by a computer, control the computer to create a software project within a virtual container grouping together tools and artifacts unique to the software project.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1A:
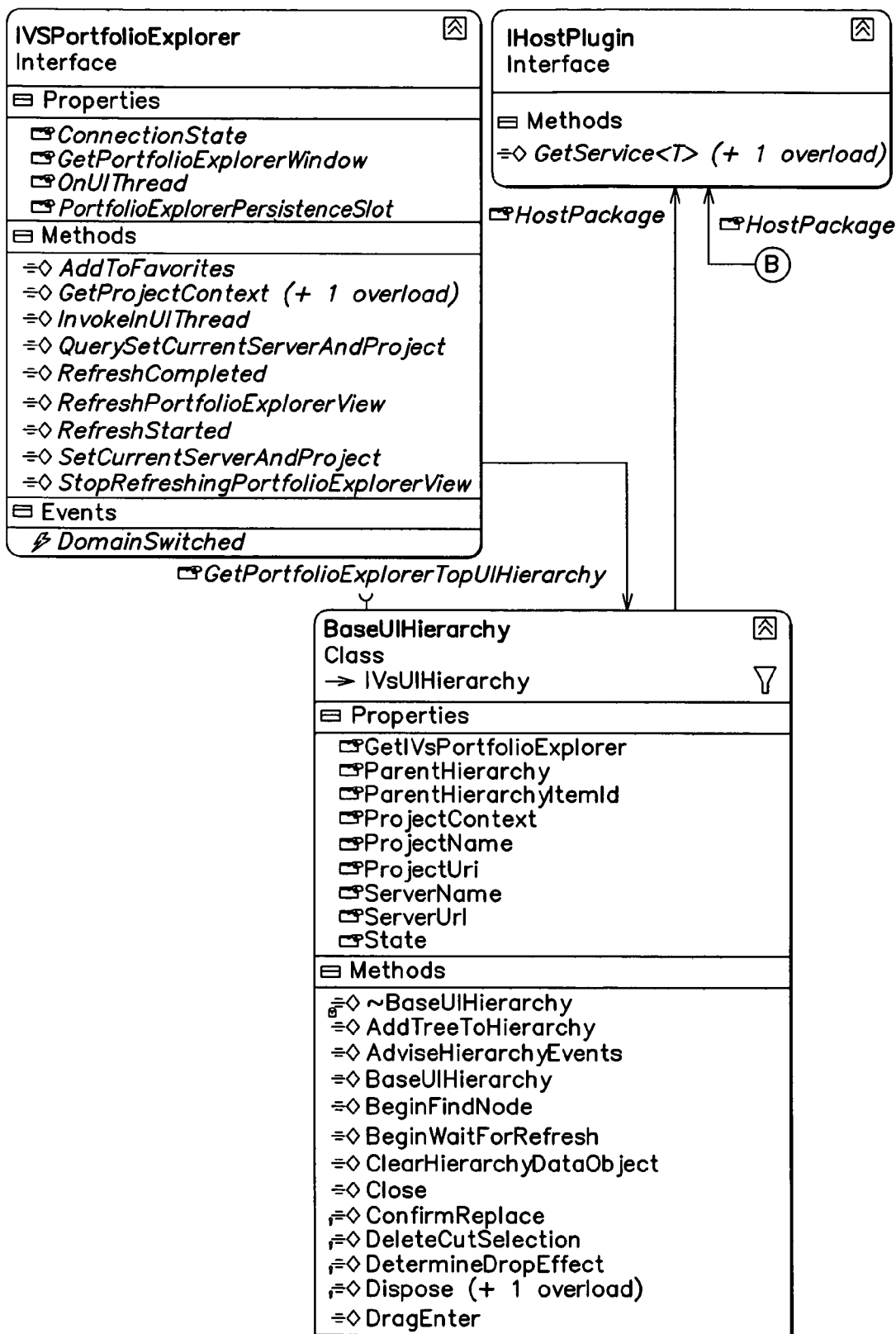
FIG. 1 is an architecture block diagram illustrating components of the present invention.
Figure 1B:
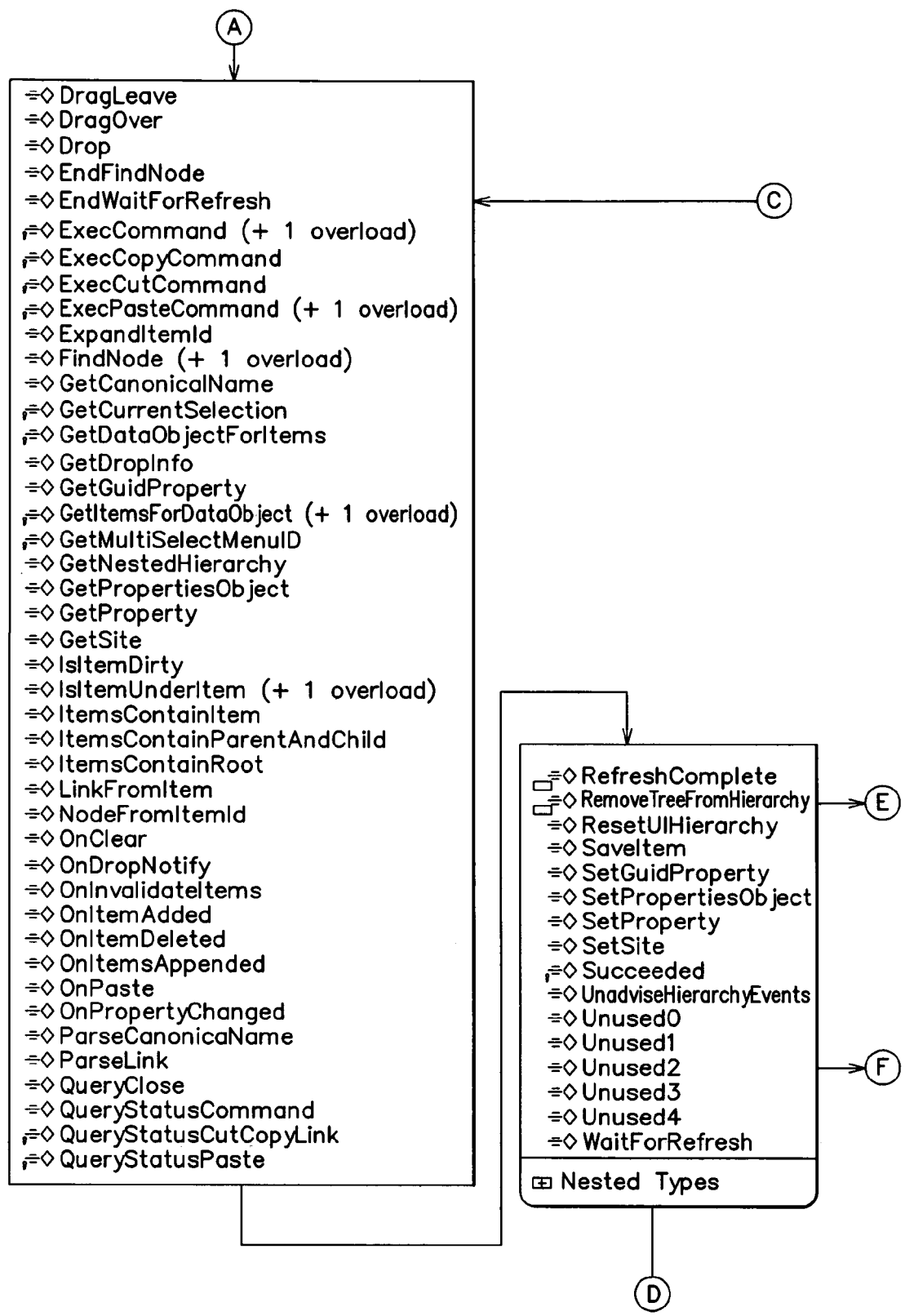
Figure 1C:
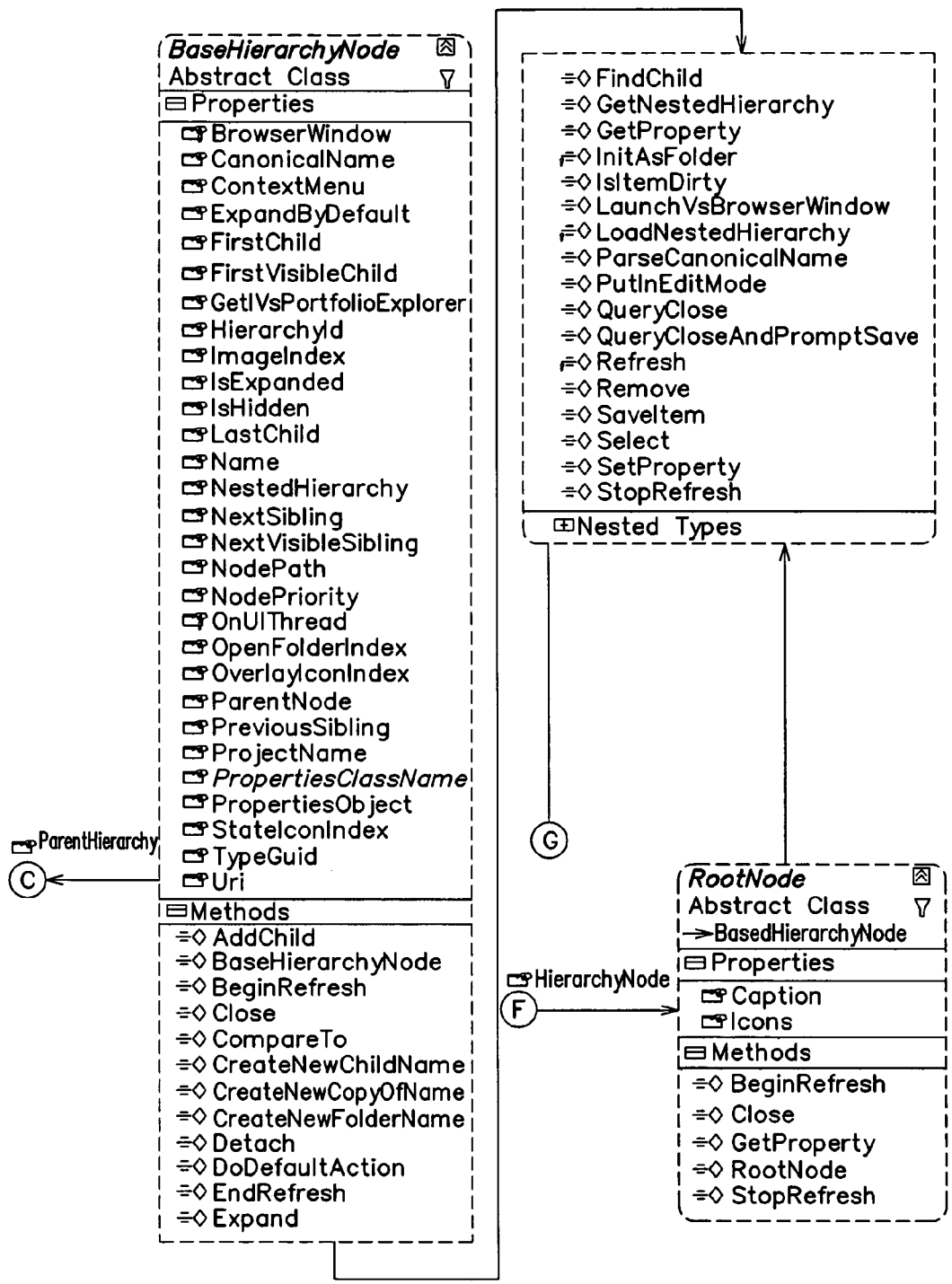
Figure 1D:
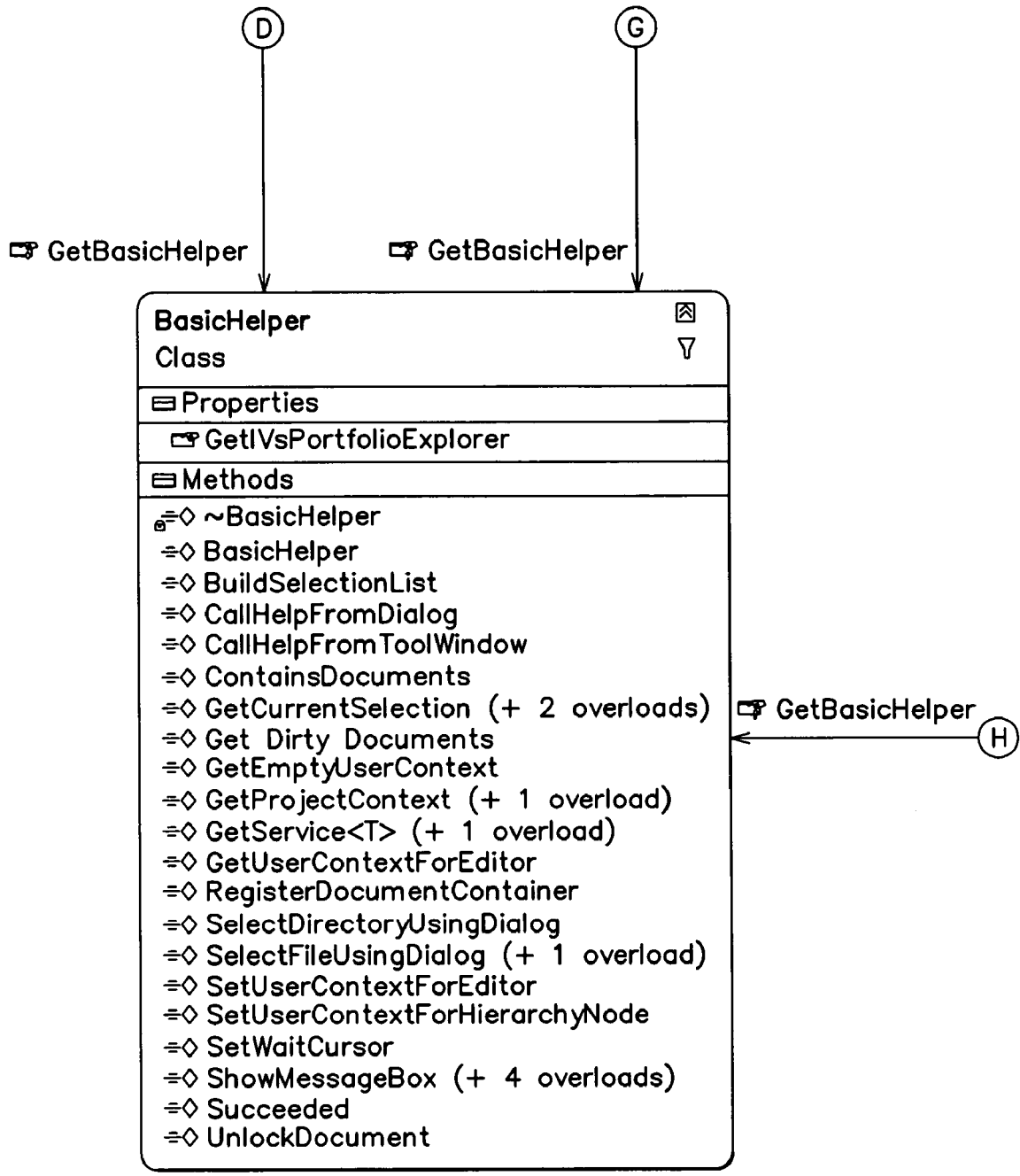
Figure 1E:
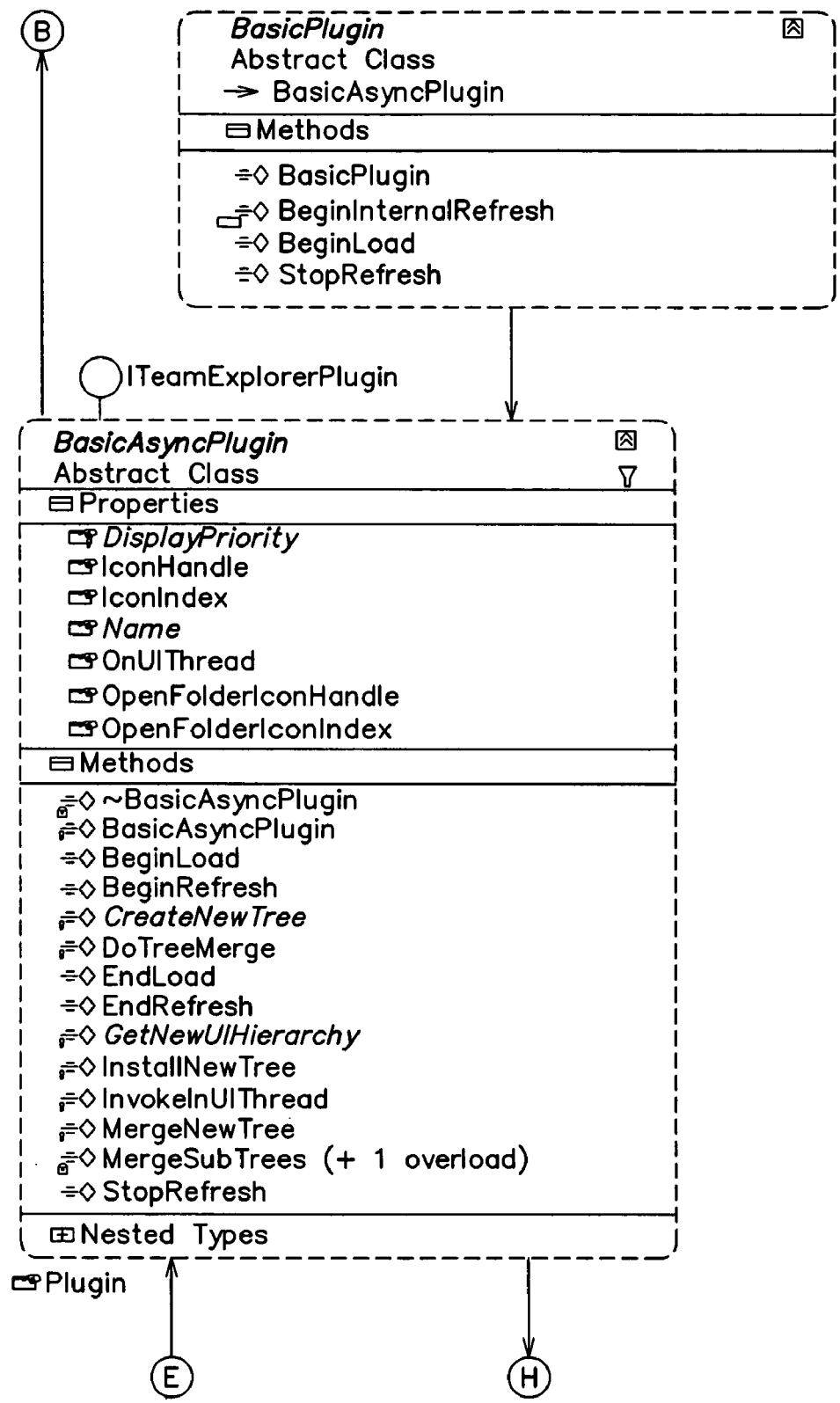
Figure 1F:
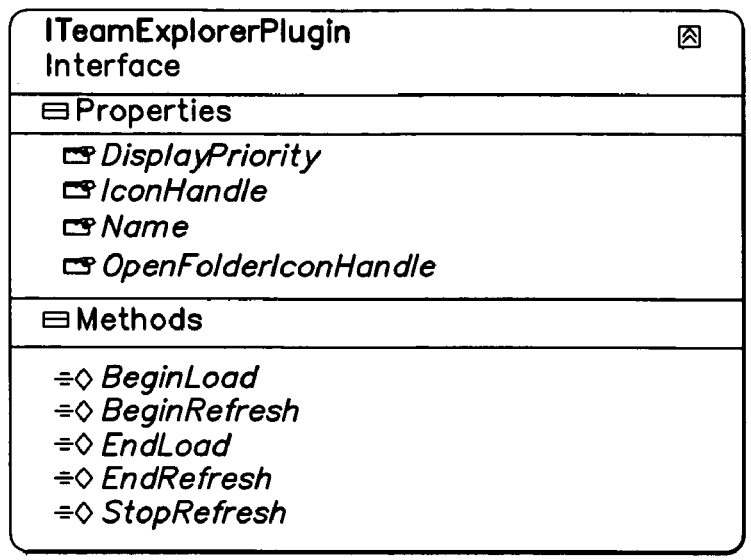
Figure 1F:
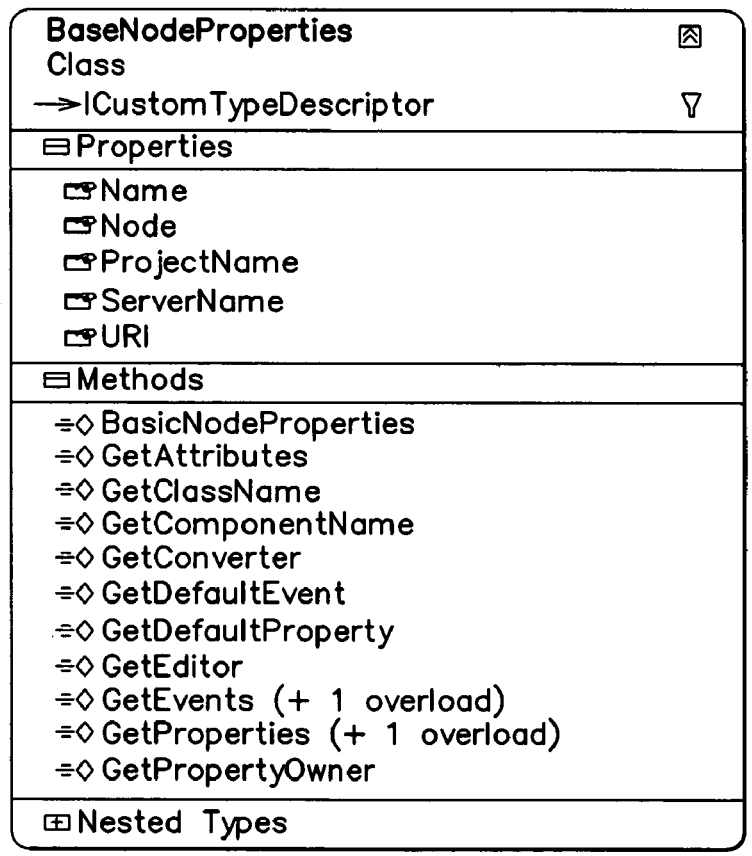
Figure 1G:
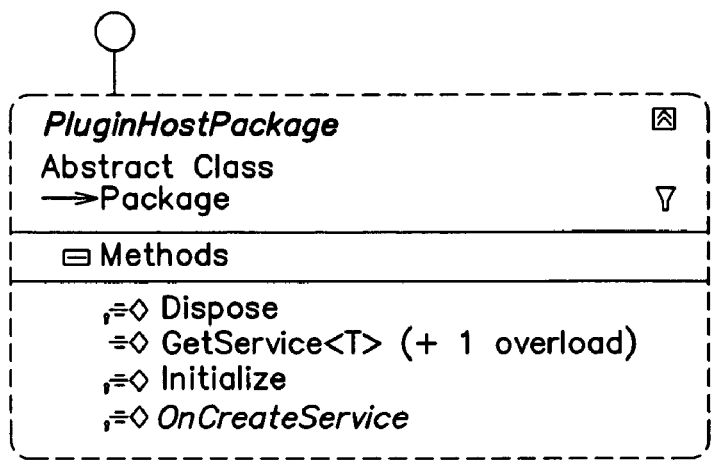
Figure 1G:
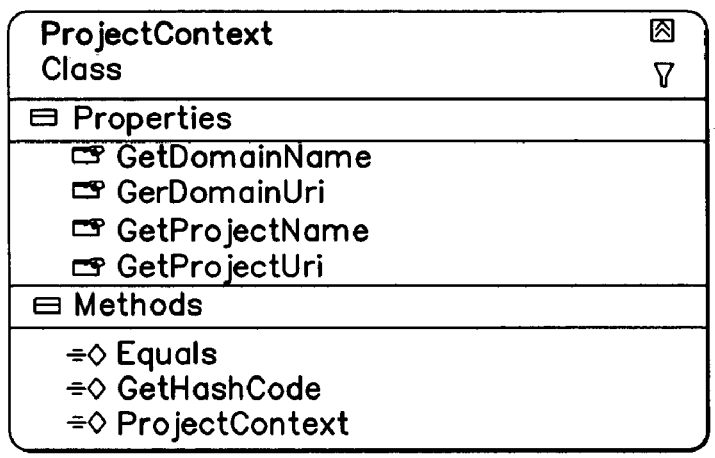
Figure 1G:
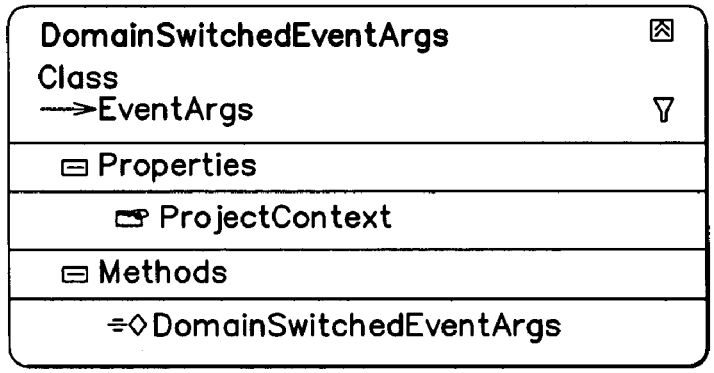
Figure 1H:
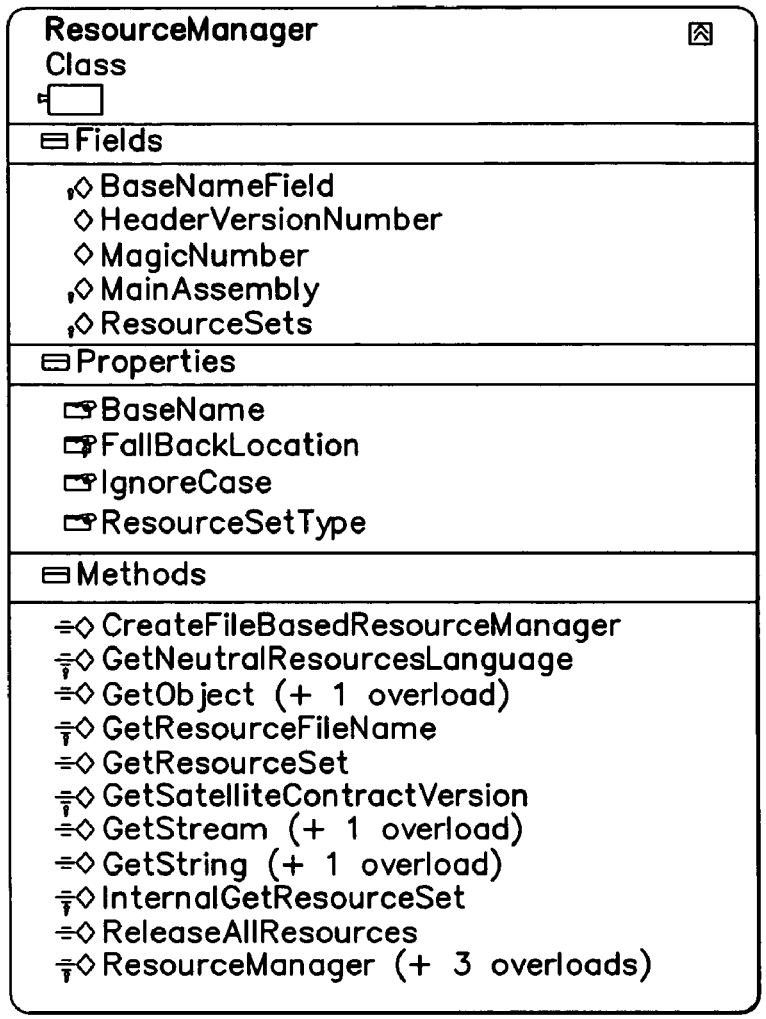
Figure 1H:
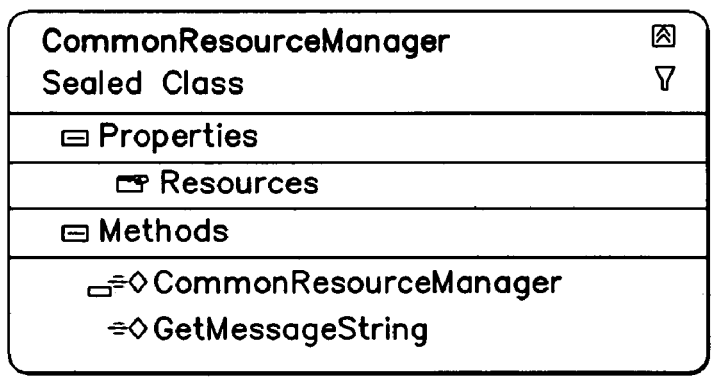

Today, in most IDEs, seamlessly finding and using the tools and artifacts relevant to a particular software project are difficult at best. Generally, it is a matter of opening several different applications, and trying to somehow filter down to what in the tool is actually relevant to a given project. With the time wasted learning all of the vastly different tools, wading through artifacts to find what is relevant, and some information not always being found, productivity and efficacy are lost. For the few solutions that offer at least some of the tools in a single application, extensibility is limited and therefore so is their effectiveness for companies using multiple and custom tools. Additionally, without tightly bringing together the tools and artifacts of a software project, cross-tool reporting on a project becomes extremely difficult.

The invention is directed towards solving the problems found in current IDEs. The invention creates a single infrastructure above all of the tools used in the lifecycle of the development of a software application. Each individual software application, or "Team Project", in development will be virtually grouped in its own namespace intended solely for the Team Project. A Team Project is basically a container isolating all of the tools and artifacts associated with a particular software application in development, such that all other projects will not have access to the tools or artifacts (e.g., source code, defect records and word documents). Multiple projects, each created in a separate namespace, may be contained in a single server. The tools and artifacts associated with a Team Project are unique to the project for which they belong.

The Team Project is the central concept that holds together the team endeavor of creating a specific software technology or product. Team Project is a virtual collection of tools and artifacts relevant to a software application on which a team is working. The Team Project concept rids a software developer the problem of having access to multiple tools and artifacts not relevant to the Team Project, such an excess of tools and artifacts causes confusion and delays the software development process.

In contrast to the prior art, the invention allows a user, during the creation of a Team Project, to select which tools are relevant and will be added in the Team Project namespace or container. A user is also able to add custom or third party tools. These additional custom or third party tools will act as a peer to the tools originally implemented in the Team Project, in other words, the new tools will function and have the same accessibility rights to the artifacts as do the original tools.

Cross-tool reporting also benefits from the Team Project concept. In the past, cross-tool reporting was challenging in that it required the additional step of distinguishing artifacts. For example if a software developer wanted to obtain a cross-tool report on defects, a user would have to distinguish the defects from multiple projects since the defects were stored in a common location. A Team Project is created in a namespace containing only tools and artifacts relevant to the project, therefore a common filter is created which can relate different artifacts from different tools. An easier method of cross-tool reporting is now possible and reports may be written which pull together information from the Team Project namespace.

This invention is not limited in its application to the details of construction and the arrangement of components set forth in the following description or illustrated in the drawings. The invention is capable of other embodiments and of being practiced or of being carried out in various ways. Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

FIG. 1 is an architectural block diagram illustrating components of the present invention.

Figure 2:
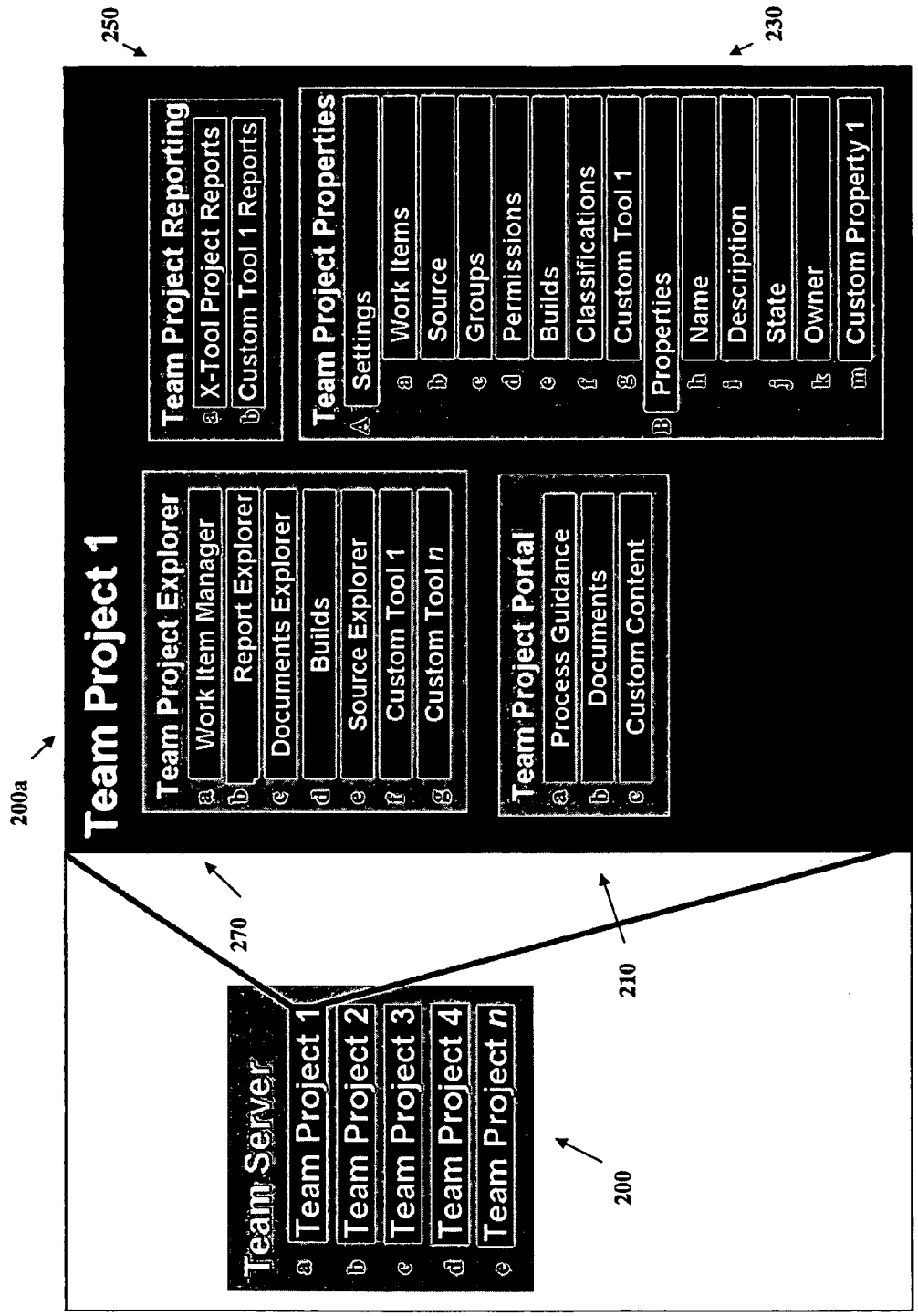
FIG. 2 illustrates an example of a Team Project created in its own namespace in an embodiment of the present invention.

FIG. 2 depicts an example of a Team Project system. A team server 200 may contain multiple Team Projects 200a-200e which are all created in a separate namespace, such that a document named X in namespace A is not the same as a document named X in namespace B. Creating a Team Project in a separate namespace allow artifacts or tools to be unique to the Team Project for which they belong, such that a tool or artifact contained in Team Project 200a is not accessible to a software developer working on Team Project 200b.

As seen from FIG. 2, Team Project 1 200a, in this illustrative example, will initially contain a Team Project explorer 270 which comprises of a plurality of tools 270a-270g. Team Project 1 200a, also comprises Team Project properties 230, Team Project reporting 250 and a Team Project Portal 210, but the invention is not so limited. A user has the ability to choose which tools or artifacts are implemented in a Team Project as well as create custom tools and artifacts or to introduce third parties tools in to the Team Project. Such flexibility eliminates the existence of irrelevant tools and artifacts or lack of necessary tools and artifacts within the project container.

The Team Project portal 210 is built on Windows Share-Point Services. Windows SharePoint Services enable teams share information, collaborate on documents, and collect team knowledge over the Internet or a corporate network. The team project portal 210 provides a place for storing documents 210b centrally for the team as well as a web front end to the Team project.

Process guidance 210a and user defined custom content 210c may also be found in the Team Project portal 210. Process guidance 210a is generally determined by a process template, illustrated in FIG. 5. Upon the creation of a Team Project a user may chose from a number of predefined process templates. The process template may provide among other things, a Team Project a process guidance 210a, which acts as a set of guidelines for the particular project. Examples of factors which help determine a process template are, but not limited to, the predicted lifecycle of the project (e.g. long or short), if the project is adapt to change (e.g. roles and accessibility rights), and which key success measures are relevant to the particular Team Project. Custom content 210c may contain relevant artifacts provided by a user, which were not implemented in the initial creation of the Team Project.

Project settings and properties vary from project to project therefore it is desired to have scoped settings and properties for each Team Project. The Team Project properties tool 230 is used to define settings 230A such as groups 230c and permissions 230d, which identify members of the Team Project and their accessibility rights. For example, one software developer may have access to change document X in a Team Project but not document Y, while another software developer involved in the same Team Project may have access to change both documents X and Y. Assigning groups 230c, helps establish the various teams within the Team Project, such a feature helps to better manage the Team Project and designate the required tasks.

Work item types 230a may also be defined by the Team Project properties tool 230. A work item is a record of anything which may be planned or tracked for the Team Project (e.g. defect records, assigned tasks and changes in artifacts). Work items may track the state of activities or tasks within them. The work item type setting 230a helps define which work items are relevant to the Team Project.

Source policies 230b help define source control settings. Source control settings characterize checkout settings, checkin policies and checkin notes. The source control settings define which artifacts may be checked out and by whom, they also help define settings which enable a user to go back in time and checkout different versions of an artifact which may have been produced during the lifecycle of the project.

The Team Project administrator may also specify build types (e.g. debug, release or custom) 230e. Different types of builds are used for various tasks during the lifecycle of the project, for example a debug build may be used to help determine defects in source code.

Classifications 230c is a virtual hierarchical grouping for artifacts within a Team Project. Examples of items which may be included in classifications include, but are not limited to, the lifecycle iterations that make up a Team Project, and the components or features of a Team Project. Work items and other artifacts such as test cases, may also be classified against the structures/hierarchies to make for easier tracking and reporting.

User defined custom settings 230g may be specified for the Team Project. User defined custom settings 230g allows for new settings to be implemented or original settings to be altered.

The Team Project properties tool may also be used to define project properties 230B such as name, description, state, owner and user defined properties 230h-230m. These properties help define and classify the Team Project.

Team Project 1 200a also contains a Team Project explorer tool 270. The team explorer is an extensible tool window which groups tools and artifacts by Team Project, also illustrated in FIG. 3. Multiple Team Projects may be simultaneously viewed via the team explorer 270. The team explorer provides easy navigation into Team Project work products within the, for example, Visual Studio® IDE. The team explorer allows team members to view information on the product builds, launch to source, query on tasks assigned to them, view overall project status, locate documents, view reports, and create work products associated with the project.

The Team Project explorer may include a work item manager 270a which manages a database of work items. Work item manager 270a enable a user to access and track the various work items as well as create new work items.

The Team Project explorer also includes a Structured Query Language (SQL) report explorer 270b which provides a means of gathering information from the various tools contained within the Team Project. The SQL report explorer 270b is designed to perform cross-tool reporting by bringing together heterogeneous information from various tools within the Team Project and form a report by employing semantics and syntax appropriate for the information exported from each tool. Since the Team Project is created within an unique namespace, there is no longer a need to distinguish the various artifacts belonging to a particular project, thus enabling cross-tool reporting to be preformed more efficiently.

The documents explorer 270c, similar to the work item manager 207a, manages and tracks documents as well as allows a user to create new documents, which are stored in the team project portal 210.

Builds explorer 270d manage and track builds as well as allow a user to create new builds. The source explorer 270e deals with artifacts such as source code and text. Program developers use the source explorer 270e to check in and out source code. The source explorer is a browser of the Team Project source files. A number of user defined custom tools 270f and 270g may be implemented by a user.

The Team Project reporting tool 250 contains cross tool project reports 250a and user defined custom reports 250b.

The cross tool project report 250a is based on information pulled together from the different tools in the Team Project namespace via the SQL report explorer 270b.

Figure 3:
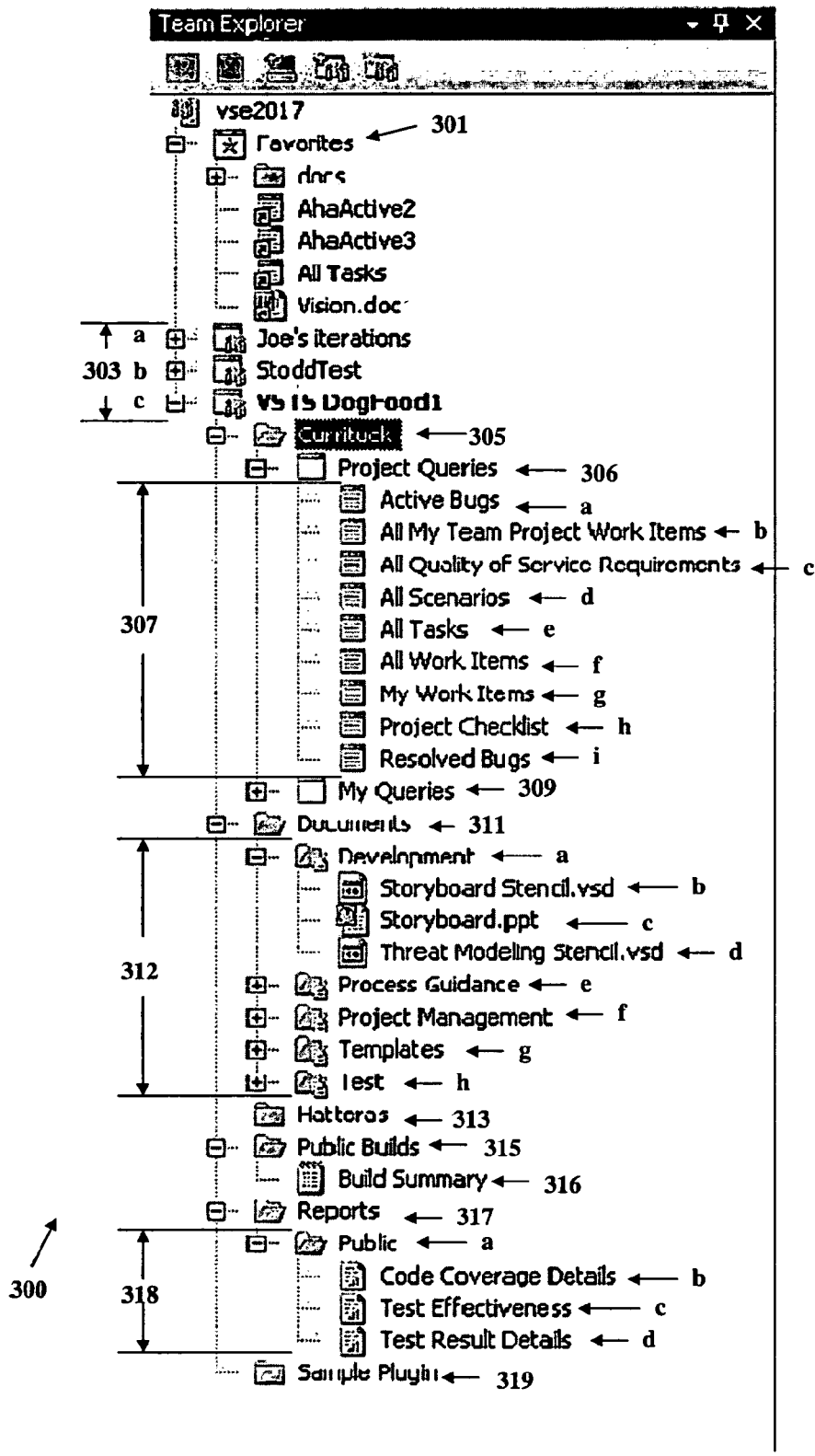
FIG. 3 depicts an example of a team explorer according to another embodiment of the present invention.

FIG. 3 illustrates an example of a team explorer 300. Multiple Team Projects 303a-303c may be viewed at once in the team explorer. The contents of Team Project 303c will now be discussed as an example, but does not limit the invention. The work item manager 305 contains project queries 306, which have been implemented by the process template or team manager upon the creation of Team Project 303c. User defined queries 309, pertains to queries which were not implemented during the creation of Team Project 303c but later added as custom content.

Project queries contains artifacts 307. The project queries may differ from project to project, below an example is given. Active bugs 307a contains the defects of Team Project 303c which are in the process of being corrected, while resolved bugs 307i contains defects which have been corrected. All my Team Project work items 307b contains work items which have been defined by the selection of the process template. All quality of service requirements 307c may contain a user defined task list. All scenarios 307d provides a listing of all the possible ways the project will be used or implemented. All tasks 307e contains work which is to be completed by the various software developers. All work items 307f may contain a listing of work items pertaining to the Team Project, while my work items 307g contains a user defined listing of work items most frequently used by the software developer. Project checklist 307h contains a listing of tasks which have and must be completed.

The document explorer and project portal 311 contains work products 312 such as documents, spreadsheets, project plans, and other intangible output from development activities. Development artifacts 312a-312d may contain information such as designs or reports pertaining to the Team Project. Process guidance 312e contains a set of guidelines for Team Project 303c. The test folder 312h may contain quality insurance artifacts such as test plans. The templates folder 312g may include document templates used by team members. The document explorer and project portal 311 may be viewed using the Sharepoint server system.

The source explorer or source code control system 313 stores work products such as source code and text. The Team Project 303c also contains a Build folder 315 containing a build summary 316 and a report explorer 317 containing relevant report data 318a-c.

Custom tools or a third party plugin 319 may also be added to Team Project 303c. Third party tools are capable of being integrated in to the Team Project and may participate as a peer to the existing tools in the project.

A user may also specify settings and properties 230 via the team explorer 300 through the a Team Project folder 303a-303c such as, for example, by highlighting it and right clicking on the same if using a mouse. Multiple Team Projects may be viewed at once using the team explorer 300. Establishing a Favorites list 301 allows for quick navigation to the tools and artifacts most important to each user.

The Project Creation Wizard is a tool used when a new Team Project is created. The Project Creation Wizard implements several key configurations to centralize team efforts on the new Team Project to be created. A Team Project web site is created containing document templates and stock reports. A work item database is created for tracking all effort on the project. A process template is instantiated that determines rules, policies, security groups and queries for all work effort.

Figure 4:
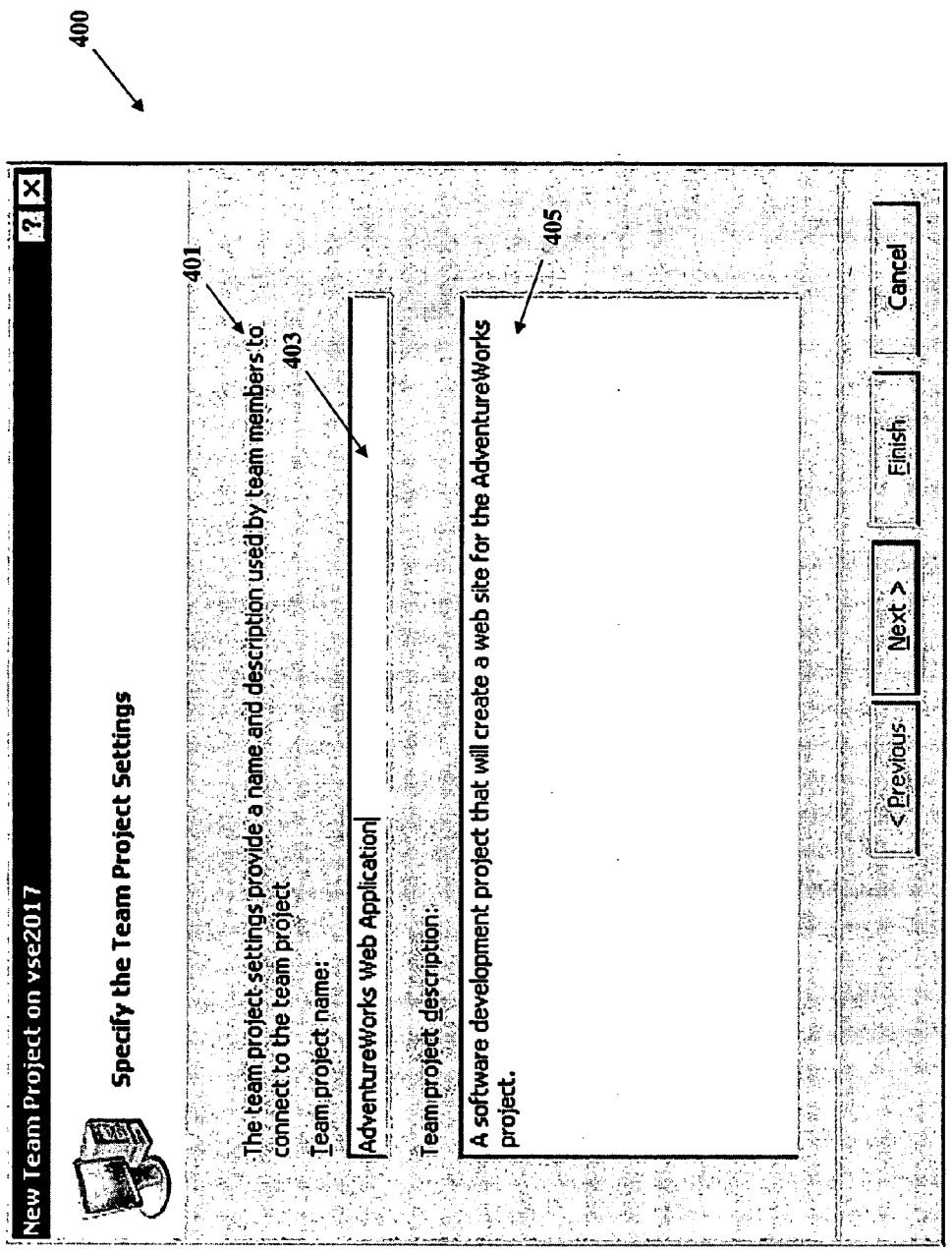
FIGS. 4 and 6-10 illustrate examples of the Team Project Creation Wizard according to another embodiment of the present invention.

When a new Team Project is to be created, a user will use a Team Project Creation Wizard which will help define the settings and description of the Team Project. FIG. 4 illustrates the Team Project settings specification step. Team Project settings window 400 contains directions 401 for providing a Team Project name 403 and a description 405 to be used by the team members involved in the project.

Figure 5:
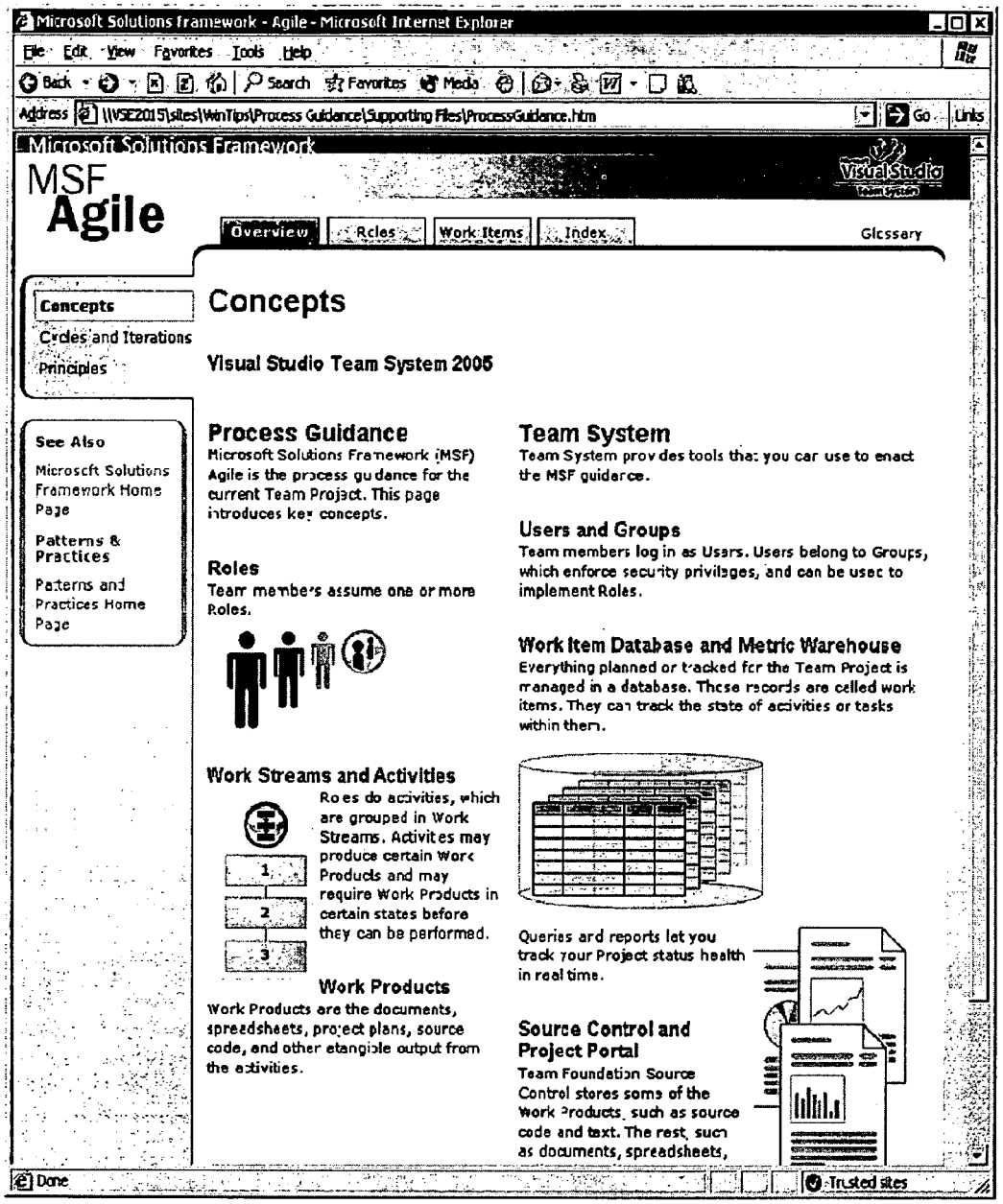
FIG. 5 illustrates a Team Project Guidance example according to an embodiment of the present invention.

The next step in the creation of a Team Project is selecting a process template. An example of a process template is illustrated in FIG. 5. Process templates, a set of documentation generally implemented by a team manager, are predefined and help outline how a particular project will be managed. A process template may define key concepts for a particular project such as work item types, work products, reports, queries, and process guidance for a Team Project. Different process templates are created for various types of projects.

Process template window 500 depicts a process guideline. A user is able to navigate through the different sections, overview, roles, work items and index, of the process guideline. Window 500 is displaying the overview section which contains a summary of the key concepts involved in a Team Project.

Figure 6:
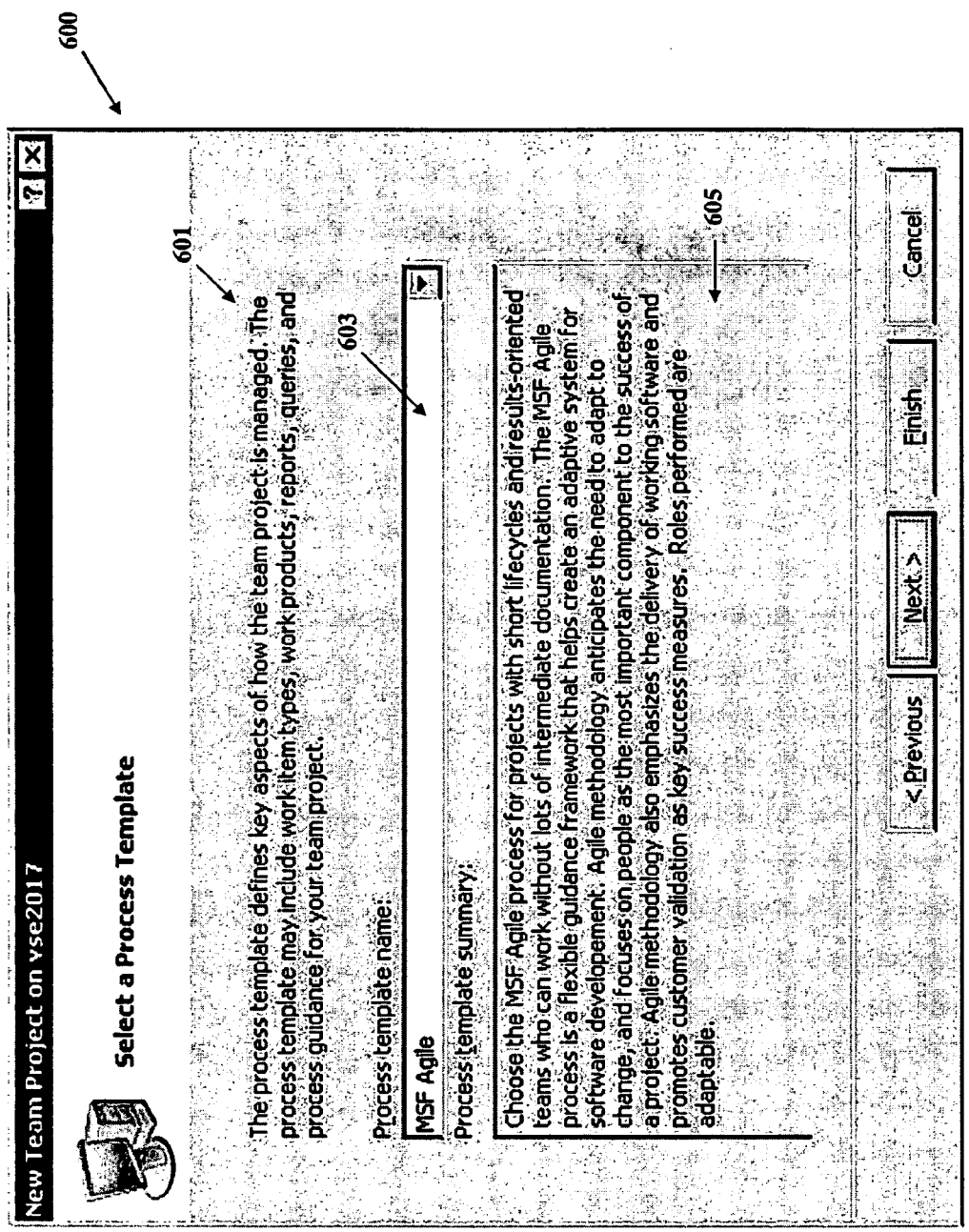

FIG. 6 illustrates the step of selecting a process template. Window 600 contains a brief description of process templates 601. A user may select from a number of predefined process templates from pull down menu 603. The description of the chosen process template may be viewed in screen 605.

Figure 7:
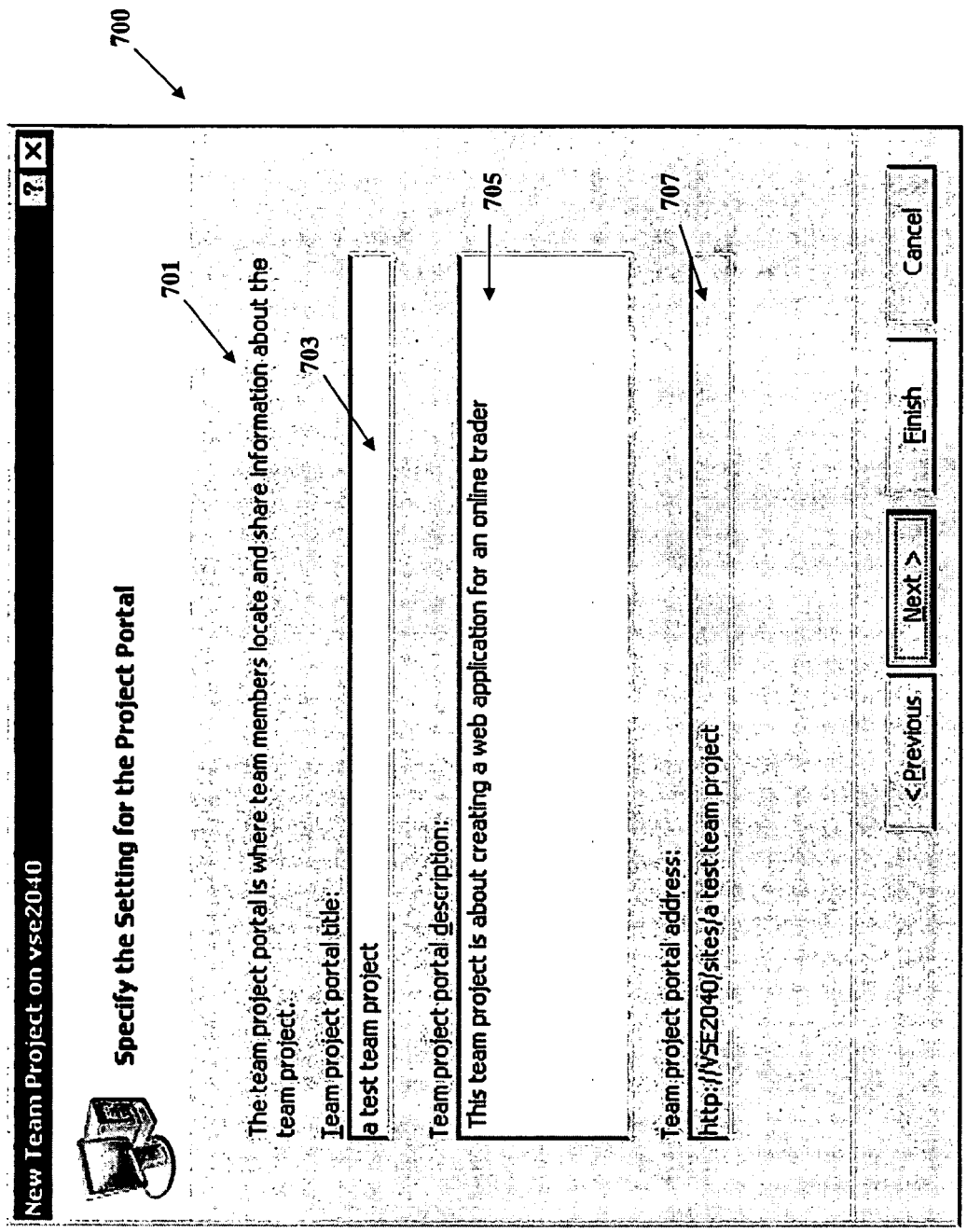

A user may also define a project portal in a namespace solely belonging to the Team Project. The project portal is used mainly for storing artifacts such as documents, spreadsheets and work items. FIG. 7 depicts the step a user takes to define a project portal. Window 700 contains a brief description of a project portal 701. The name of the project portal 703 and a description of the Team Project and team portal contents 705 are provided by a user. The address of the project portal 707 is shown to indicate where the project portal is to be located in the system.

Figure 8:
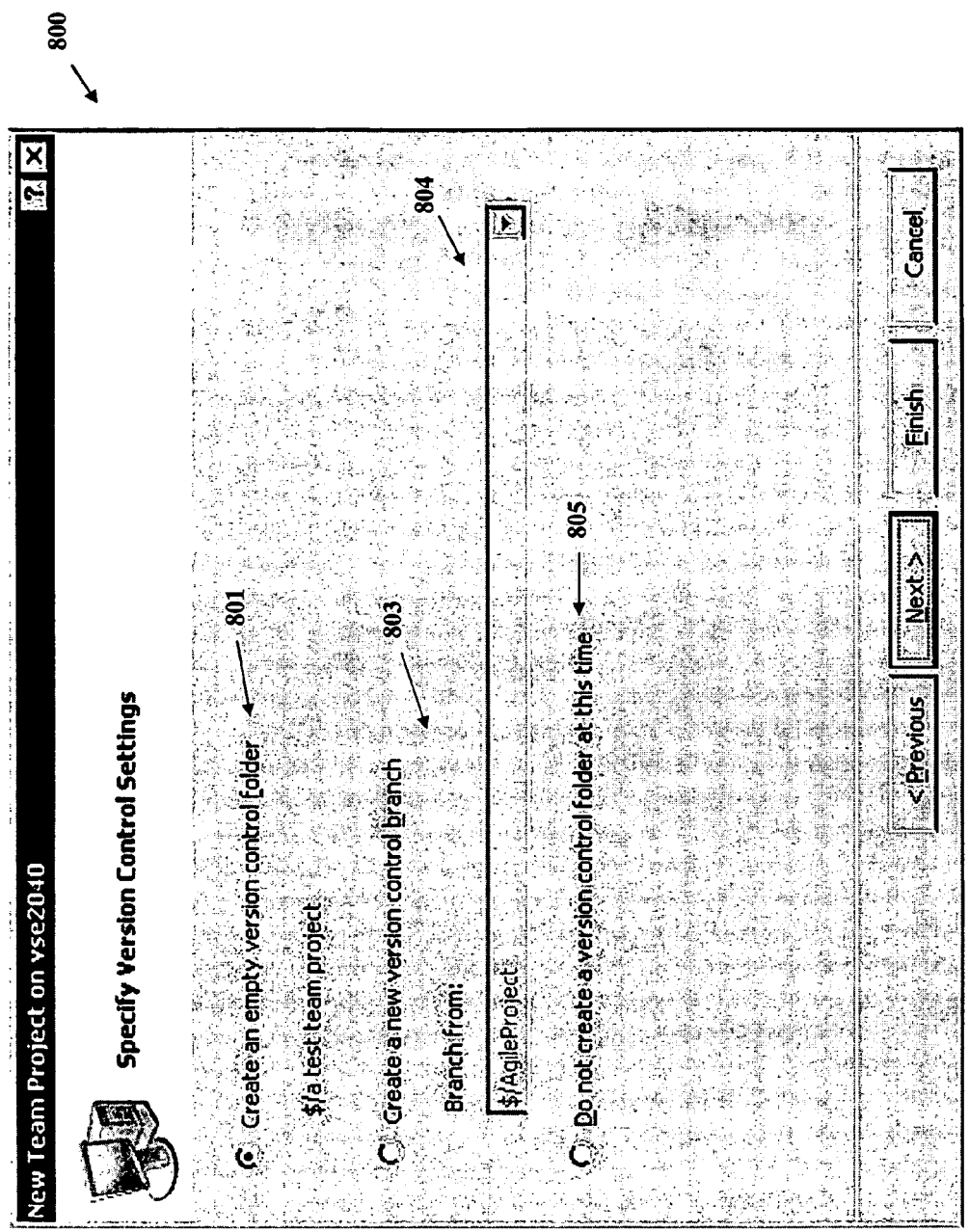

FIG. 8 illustrates the version control settings specification step. A user is presented with window 800 and is given the option to create an empty version control folder 801, create a new version control branch 803, or to create a version control folder at another time 805. Creating a new version control branch 803 will copy all of the continents of a version control folder from an already existing Team Project to the Team Project which is to be created. Drop down menu 804 displays all of the current Team Project version control folders available.

Figure 9:
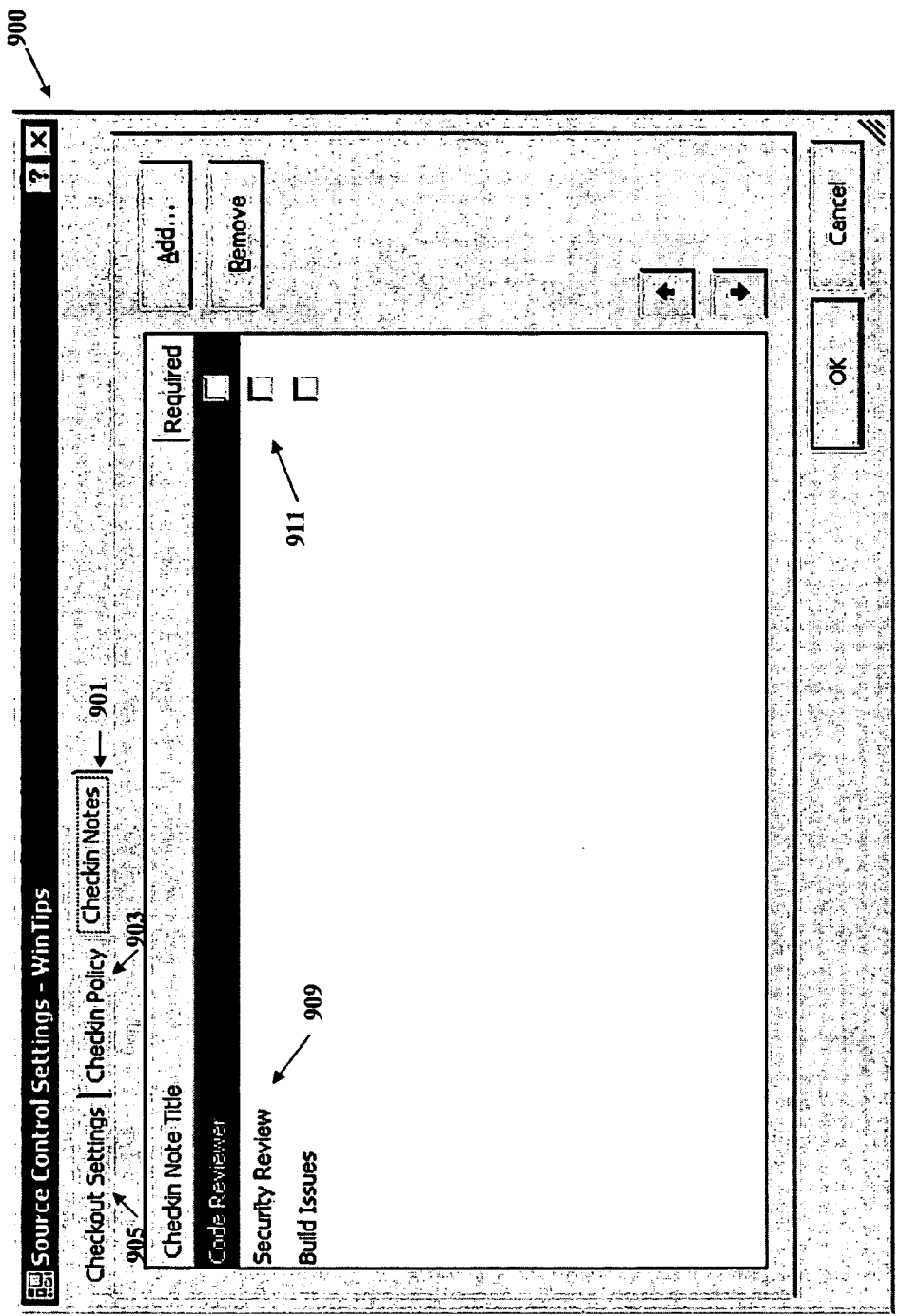

Source control settings may also be specified, as shown in FIG. 9. A source control settings window 900 allows a user to define artifact checkin and checkout settings and properties. A user may specify checkin notes 901 settings by defining which work products 909 are required to be checked in 911. Checkout settings 905 and checkin policies 903 may also be defined. Using the source control system, a user is able to retrieve or checkout a document. The user may obtain different versions of the document which have been throughout the lifecycle of the project.

Figure 10:
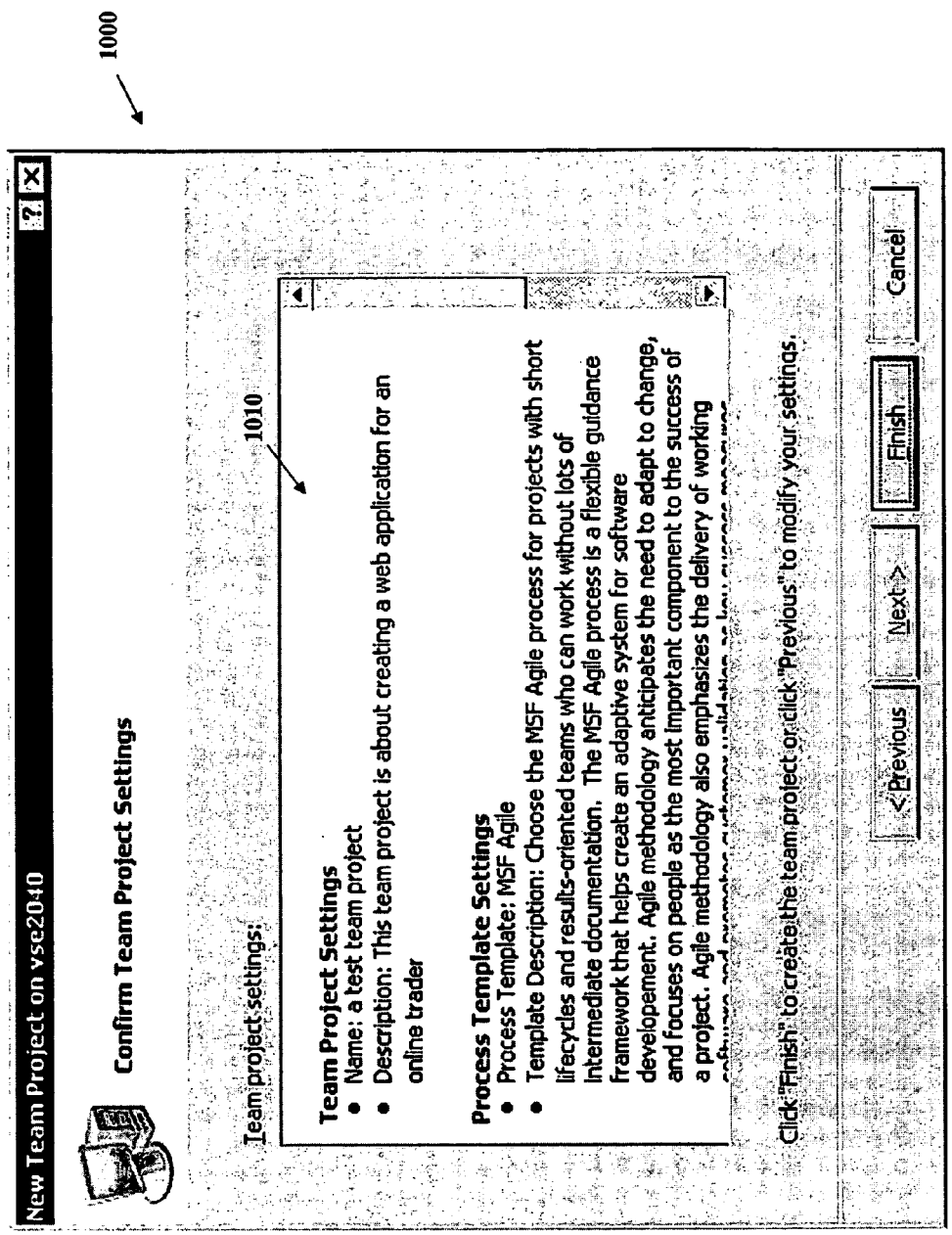

As a final step, the Team Project Creation Wizard allows a user to review and confirm the chosen project settings in FIG. 10. A confirm window 1000 lists all of the settings and descriptions for the Team Project through a display window 1010. Once the settings have been confirmed, a user may still adjust settings and properties via the team explorer.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A computer-readable storage medium encoded with computer-executable instructions that, as a result of being executed by a computer, control the computer to perform a method comprising:

creating a first virtual container to contain a first software project, the first virtual container defined by a first team project namespace;

placing first instances of a set of user selected tools and first artifacts within the first virtual container;

creating a second virtual container to contain a second software project, the second virtual container defined by a second team project namespace;

placing second instances of the set of user selected tools and second artifacts within the second virtual container;

providing access to the first and second virtual containers through the first and second team project namespaces, respectively, in an integrated development environment (IDE), wherein the first instances of the tools and the first artifacts are unique to the first software project and the second instances of the tools and the second artifacts are unique to the second software project, wherein the first instances of the tools include at least a first cross-tool reporting tool, the first cross-tool reporting tool configured to generate first report data from the first instances of the tools and the first artifacts unique to the first software project; and displaying within the IDE a tool window for navigating through the first instances of the tools and the first artifacts unique to the first software project within the first virtual container, wherein the tool window is further configured to simultaneously display the second instances of the tools and the second artifacts of the second software project.

2. The computer-readable storage medium of claim 1, wherein the tool window is operable to view a plurality of software projects.

3. The computer-readable storage medium of claim 1, wherein the first instances of the tools are extensible.

4. A computer-implemented method of managing software projects on a computer system, the method comprising acts of:

creating a first virtual container to contain a first software project, the first virtual container defined by a first team project namespace;

placing first instances of a set of user selected tools and first artifacts within the first virtual container;

creating a second virtual container to contain a second software project, the second virtual container defined by a second team project namespace;

placing second instances of the set of user selected tools and second artifacts within the second virtual container;

providing access to the first and second virtual containers through the first and second team project namespaces, respectively, in an integrated development environment (IDE), wherein the first instances of the tools and the first artifacts are unique to the first software project and the second instances of the tools and the second artifacts are unique to the second software project, wherein the first instances of the tools include at least a first cross-tool reporting tool, the first cross-tool reporting tool configured to generate first report data from the first instances of the tools and the first artifacts unique to the first software project; and displaying within the IDE a tool window for navigating through the first instances of the tools and the first artifacts unique to the first software project within the first virtual container, wherein the tool window is further configured to simultaneously display the second instances of the tools and the second artifacts of the second software project.

5. The computer-implemented method of claim 4, further comprising an act of:

instantiating a selected process template in the first virtual container, the process template defining how the first software project will be managed.

6. The computer-implemented method of claim 4, further comprising an act of:

copying version control settings from the first virtual container to a version control folder within the second virtual container to establish version control settings for the second project.

7. The computer-implemented method of claim 4, wherein:

the first instances of the tools include a first cross-tool reporting tool configured to generate first report data from the first instances of the tools and the first artifacts unique to the first software project; and the second instances of the tools include a second cross-tool reporting tool configured to generate second report data from the second instances of the tools and the second artifacts unique to the second software project.

8. The computer-implemented method of claim 4, wherein the first instances of the tools are extensible.

9. A computer-readable storage medium encoded with computer-executable instructions that, as a result of being executed by a computer, control the computer to perform a method comprising acts of:

creating, in a first unique namespace, a first virtual container for a first software project;

placing first instances of a set of user selected tools within the first virtual container;

creating, in a second unique namespace, a second virtual container for a second software project;

placing second instances of a set of user selected tools within the second virtual container; and providing access to the first and second virtual containers through an integrated development environment (IDE), wherein the first instances of tools are unique to the first software project and the second instances of tools are unique to the second software project, wherein:

the first set of user selected tools comprises a first cross-tool reporting tool configured to generate first report data from the first set of user selected tools and first artifacts unique to the first software project;

the second set of user selected tools comprises a second cross-tool reporting tool configured to generate second report data from the second set of user selected tools and second artifacts unique to the second software project; and instantiating a selected process template in the first virtual container, the process template defining how the first software project will be managed.

10. The computer-readable storage medium of claim 9, wherein the method further comprises an act of:

copying version control settings from the first virtual container to a version control folder within the second virtual container to establish version control settings for the second software project.

11. The computer-readable storage medium of claim 9, wherein the method further comprises acts of:

storing first artifacts unique to the first software project within the first virtual container; and storing second artifacts unique to the second software project within the second virtual container.

* * * * *